SHIP'S MAGNETIC COMPASS

Filed Nov. 7, 1952 6 Sheets-Sheet 1

INVENTORS
NYE S. SPENCER
ALVIN G. McNISH
HUGH F. GINGERICH
BY B. L. Zangwill
George Sipkin
ATTORNEYS

SHIP'S MAGNETIC COMPASS

INVENTORS
NYE S. SPENCER
ALVIN G. McNISH
HUGH F. GINGERICH
BY B. L. Zangarell
George Sipkin
ATTORNEY INVENTORS
NYE S. SPENCER
ALVIN G. McNISH
HUGH F. GINGERICH
B. L. Zangwill
BY George Sipkin
ATTORNEYS March 20, 1956 N. S. SPENCER ET AL 2,738,591

SHIP'S MAGNETIC COMPASS

Filed Nov. 7, 1952 6 Sheets-Sheet 4

INVENTORS
NYE S. SPENCER
ALVIN G. McNISH
HUGH F. GINGERICH

BY B. L. Zangwill
George Sipkin
ATTORNEY

SHIP'S MAGNETIC COMPASS

Filed Nov. 7, 1952 6 Sheets-Sheet 5

INVENTORS
NYE S. SPENCER
ALVIN G. McNISH
HUGH F. GINGERICH
BY B. L. Zangwill
George Sipkin
ATTORNEY March 20, 1956 N. S. SPENCER ET AL 2,738,591

SHIP'S MAGNETIC COMPASS

Filed Nov. 7, 1952 6 Sheets-Sheet 6

INVENTORS
NYE S. SPENCER
ALVIN G. McNISH
HUGH F. GINGERICH

BY B. L. Zangwill
George Sipkin
ATTORNEY

United States Patent Office 2,738,591

Patented Mar. 20, 1956

2,738,591

SHIP'S MAGNETIC COMPASS

Nye S. Spencer, Merion Station, Pa., Alvin G. McNish, Chevy Chase, Md., and Hugh F. Gingerich, Arlington, Va., assignors to the United States of America as represented by the Secretary of the Navy Application November 7, 1952, Serial No. 319,352

7 Claims. (Cl. 33—225)

The present invention relates to navigation apparatus and more particularly to an improved ship's magnetic compass for use on ships that are subject to the effect of magnetic fields.

In the past it has been found that modern vessels having increased amounts of armament, armor plating and other magnetic material located in the vicinity of a magnetic compass have acted to critically augment the usual prior compass errors. The result of such increases in magnetic materials for the modern type of ship are such that both stronger and additional corrector facilities in the form of permanent magnets and coils must be incorporated into present compasses in order to properly counteract magnetic fields which adversely affect the normal operation of the compass. These magnetic fields normally comprise (1) the earth's field which changes from one latitude to another, (2) the permanent fields which are inherent in every steel ship, such permanent fields resulting from building the ship on a particular heading and from the hammering, riveting, etc., that normally take place in the construction, and (3) the magnetic field resulting from the degaussing operation of a ship. The existing types of compass equipments are considered undesirable primarily because they were not designed for application to the modern type of ship. During World War II, for lack of modern designs, conventional equipments were procured and modified with larger correctors in an attempt to effectively reduce the different magnetic fields which act on the ship's compass. However, all of the undesirable conditions could not be corrected in this manner and while such measures can correct certain conditions, they magnify the effects of others. The new designs were aimed toward quicker production and the use of substitute materials rather than striving for improved performance, completeness and adaptability of the equipment. The intensity of modern navigation, particularly under wartime conditions, makes it extremely necessary that the compass be adapted for maintenance of its normal characteristics at all times.

Accordingly it is an import object of the present invention to provide an improved magnetic compass completely self sufficient in a wide variety of installations.

Another such object is to integrate correctors and compass elements in such a manner that correctors achieve an ultimate degree of effective action impossible in prior apparatus.

It is a further object of the present invention to provide an improved compass mounting ring for simplifying the alignment of the compass.

It is still another object of the present invention to provide a new assembly of compass card, float and magnetic assembly.

Another object of the invention is the provision of a complete degaussing compensating coil system incorporated in the binnacle of the compass.

With these and other objects in view, as will hereinafter more fully appear, and which will be more particularly pointed out in the appended claims, reference is now made to the following description taken in connection with the accompanying drawings in which:

Figure 1:
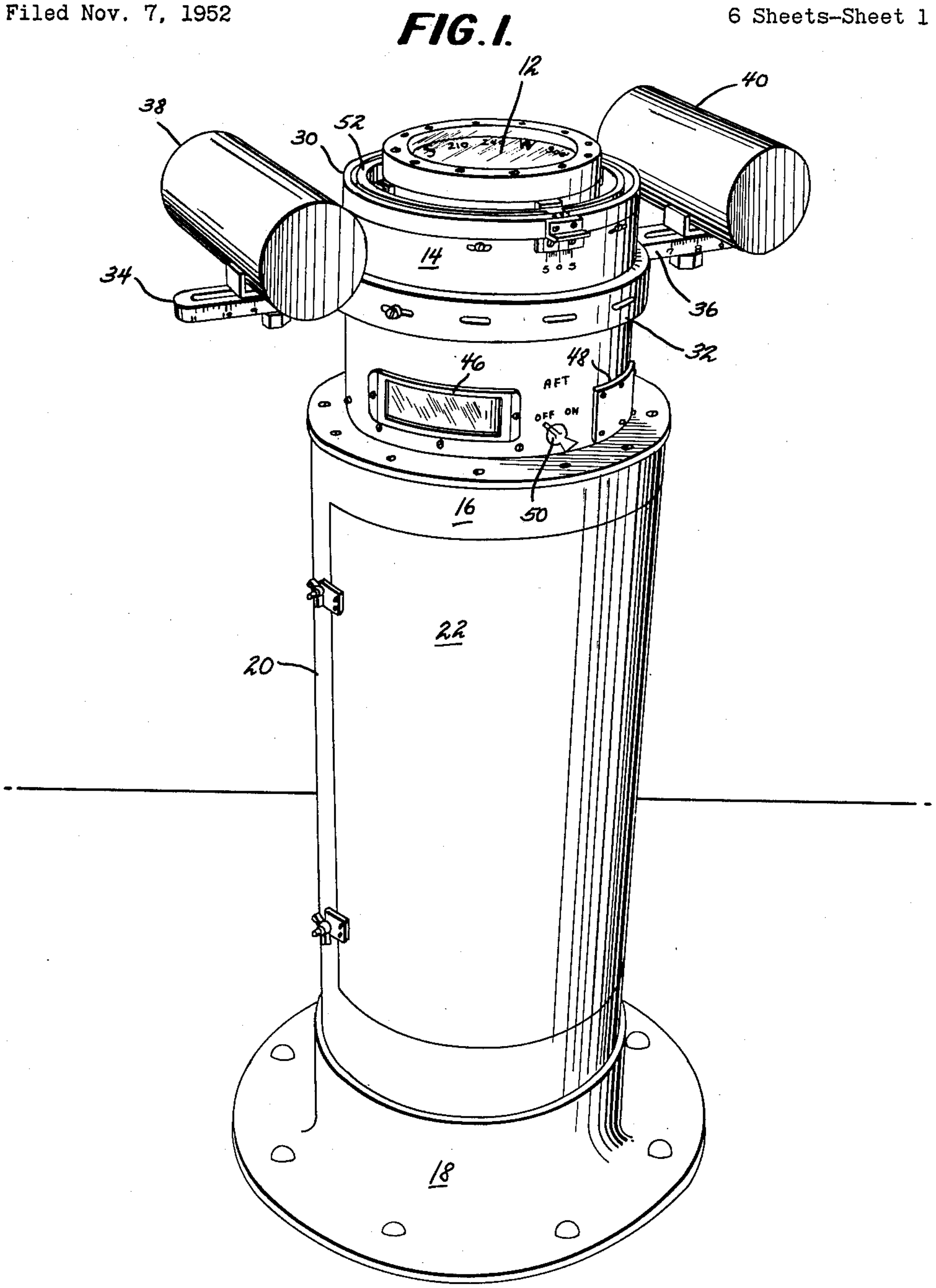
Fig. 1 is a perspective view of the compass of the instant invention including a binnacle and a pedestal supporting means therefor.

Referring now to the drawings, there is shown in Fig. 1 a complete installation of the magnetic compass comprising the instant invention. The installation comprises a compass 12 mounted in a binnacle 14 which in turn is supported on a pedestal 16. The pedestal comprises a round cylindrical housing having a base 18 supporting an upstanding cylindrical member 20 having an opening therein for receiving door 22. Mounted within the pedestal 16 are the necessary controls and resistors which are associated with the degaussing unit as fully explained hereinafter.

Figure 5:
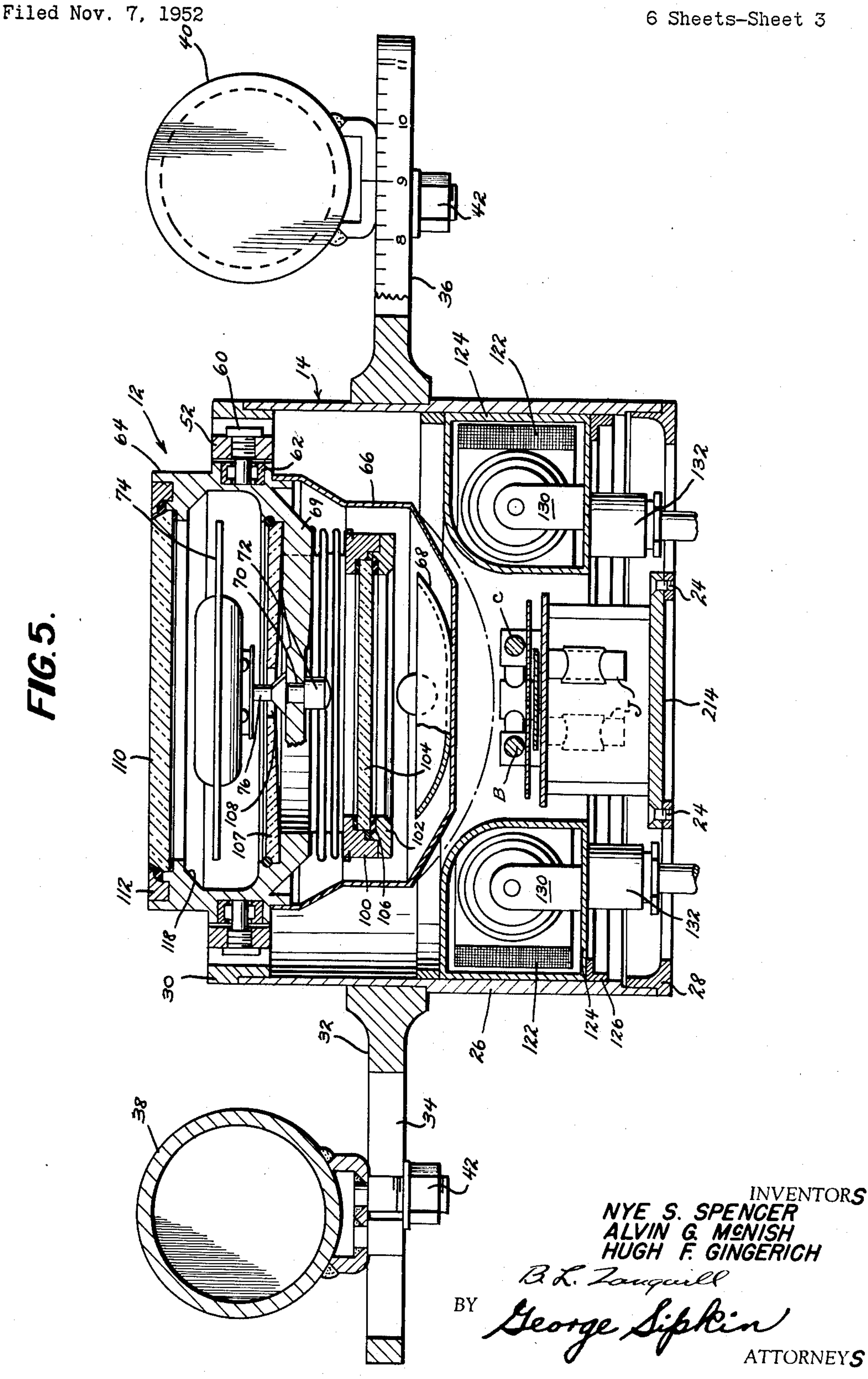
Fig. 5 is a sectional view in elevation of the compass and binnacle assembly including the soft iron corrector elements.

The binnacle unit 14 is secured to the pedestal by means of bolts, and as shown in Figure 5, comprises a shell 26 having a base plate 28 mounted in the bottom thereof and a binnacle ring 30 fitted into the upper open end of shell 26. A quadrantal corrector bracket 32 is adapted to fit around the outer periphery of the shell and comprises an endless ring having two protruding bars 34 and 36 extending laterally from the ring and in direct alignment with one another. These bars are slotted to respectively receive a pair of quadrantal correctors 38 and 40 which are secured in the respective slots of bars 34 and 36 by means of a hex nut 42 on the lower ends thereof. The bars are also appropriately marked in inches so as to position each of the quadrantal correctors at equal distances from the center line of the compass.

Figure 2:
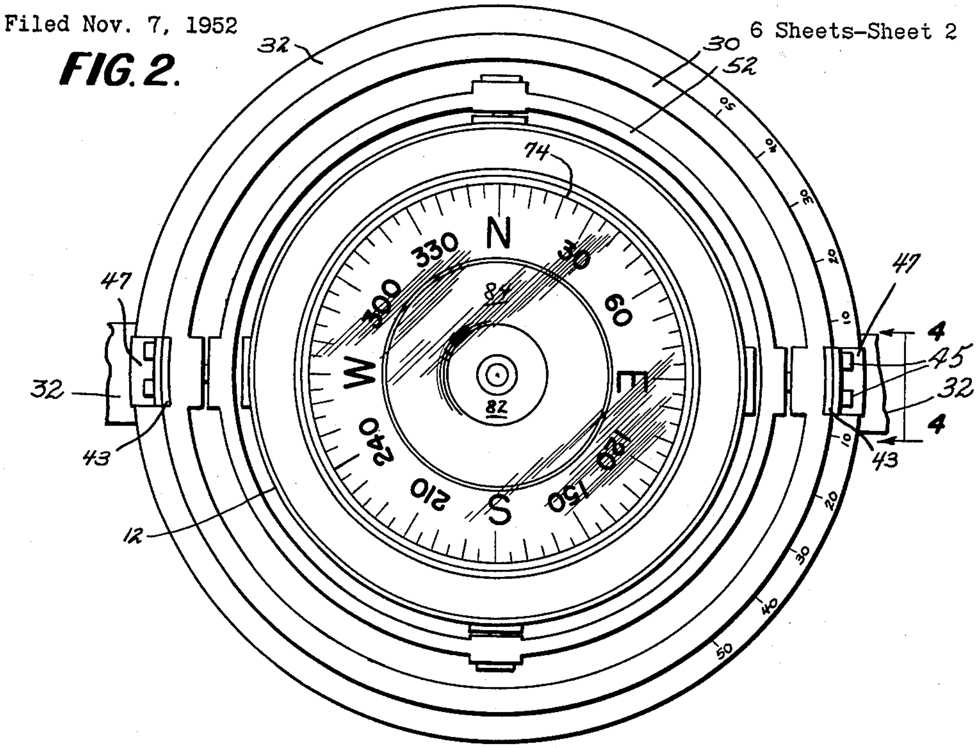
Fig. 2 is a plan view of the compass supported in the binnacle assembly.

Mounted on the upper top side of the circular ring 30, Figure 2, are a plurality of numbers indicating degrees running fifty degrees either side of zero, zero falling on the center line of the bars as shown in Figure 2. The purpose of these angular markings is to properly orient the quadrantal correctors about the compass. It is possible for one skilled in the art to devise a set of curves indicating the amount of deviation resulting from induced magnetic fields acting on horizontal soft iron masses in the ship and from these curves the correct position of the quadrantal correctors can be vectorially determined. This position that is chosen from the chart or curves is such that it will indicate in degrees the exact position in which the quadrantal correctors must be located with respect to the compass located inside the binnacle.

Figure 4:
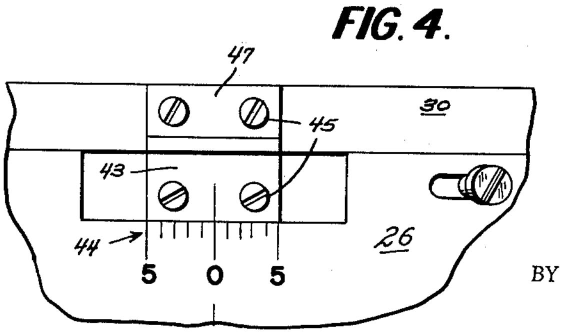
Fig. 4 is a view taken on lines 4—4 of Fig. 2.

The binnacle ring 30, mounted in the upper end of the binnacle shell 26, is movable as shown in Fig. 4, thus making it possible to properly orient the compass in the binnacle proper. After the compass is oriented in a selected position, further horizontal rotational movement of the binnacle ring 30 and attached compass is prevented by a pair of oppositely disposed flat rectangular plates 43. The plates are attached at one end to the binnacle shell 26 and at the other end to the binnacle ring 30 by means of screws 45. The binnacle ring is provided with a pair of slots or grooves, as shown in Figure 2, for receiving the plates 43, and after the screws 45 are fixed in position, the binnacle ring is firmly attached to the binnacle shell 26 and rotation of the ring and compass is thereafter made impossible. A pair of additional plates 47 formed in the shape of an angle iron of L-section are respectively fitted over plates 43 and are also affixed to binnacle shell 30 by the screws 45. The plates 47 serve to prevent the quadrantal corrector bracket 32 from becoming detached from the binnacle when the apparatus is moved or transported from one place to another. A scribe mark is imprinted on the plate to aid in aligning the binnacle ring with indicia 44 on the binnacle shell.

As better shown in Figure 1, there are two rectangular openings 46 and 48 respectively in the bottom of the binnacle shell, one of which serves to receive a tabulating card while the other serves to house knobs and pointers connected to a series of gears containing a plurality of magnets for counteracting the ship's magnetic influences which adversely affect the operation of the compass. Mounted between these openings is a control switch 50 which controls the flow of current to a light bulb positioned inside the binnacle as explained hereinafter.

Figure 3:
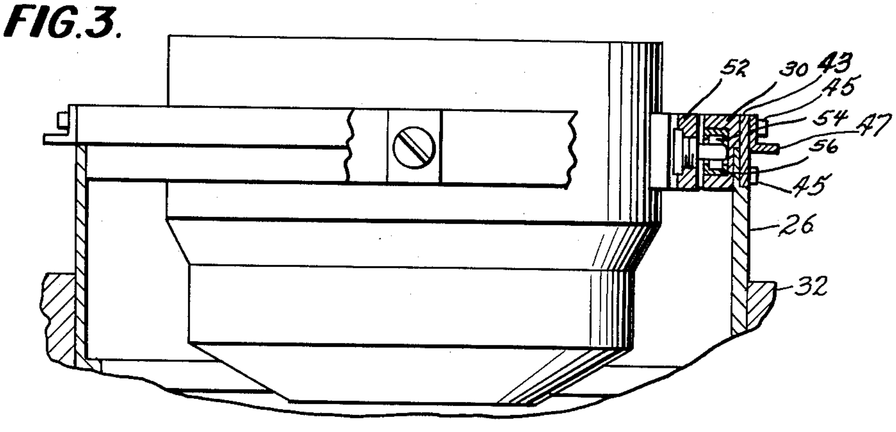
Fig. 3 is a sectional view in elevation showing the gimbal ring and binnacle ring mounted on the binnacle shell.

As mentioned above, the binnacle ring is movable around the upper outer portion of the binnacle shell. It is desirable to have the compass face or card lie in a plane that is consistently horizontal as the ship rolls and pitches. To achieve this condition, a gimbal ring 52 is supported on its opposite sides in the binnacle ring 30 by means of needle bearings 54, Figure 3, held in place in ring 30 by means of needle bearing races 56. The compass proper is properly mounted for fore and aft rotational movement in the gimbal ring 52 by means of a trunnion stud 60, Figure 5, extending through the gimbal ring and supported in a trunnion bushing 62 positioned in an opening provided in the compass bowl 64. The above described compass supporting structure is such that as the ship rolls from the one side to another, the binnacle 14 and pedestal 16 will assume the same angle of roll since they are secured to the deck structure. The compass, however, will maintain a position in the horizontal plane because of the floating condition of the gimbal ring 52 in the binnacle ring 30. As the ship pitches, the compass will still maintain a horizontal position because of the trunnion mounting of the compass proper in the gimbal ring. In normal operation, these movements of the ship are not separate or distinct but rather concurrent since ships generally roll while at the same time pitching into the sea.

Figure 6:
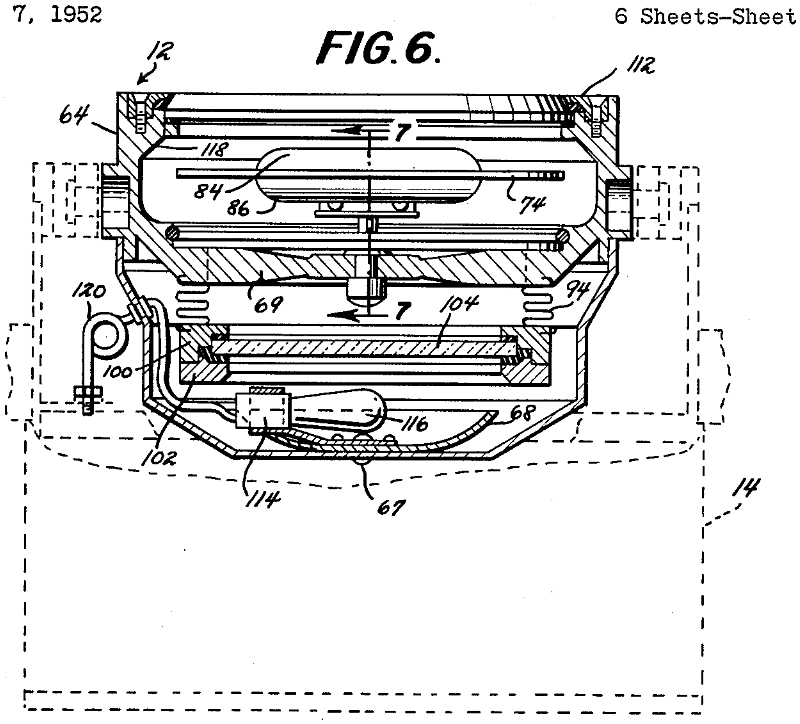
Fig. 6 is a sectional view in elevation of the compass section mounted in the binnacle, the latter being shown in dotted lines.

Secured to the bottom of the compass bowl is a bottom cover 66, Figures 5 and 6, having a light reflector 68 positioned therein and secured thereto by means of rivets 67. The specific details of the lighting arrangement for this type compass are disclosed in applicants' co-pending application Serial No. 319,353, filed November 7, 1953, entitled Compass Illuminating Assembly.

Figure 7:
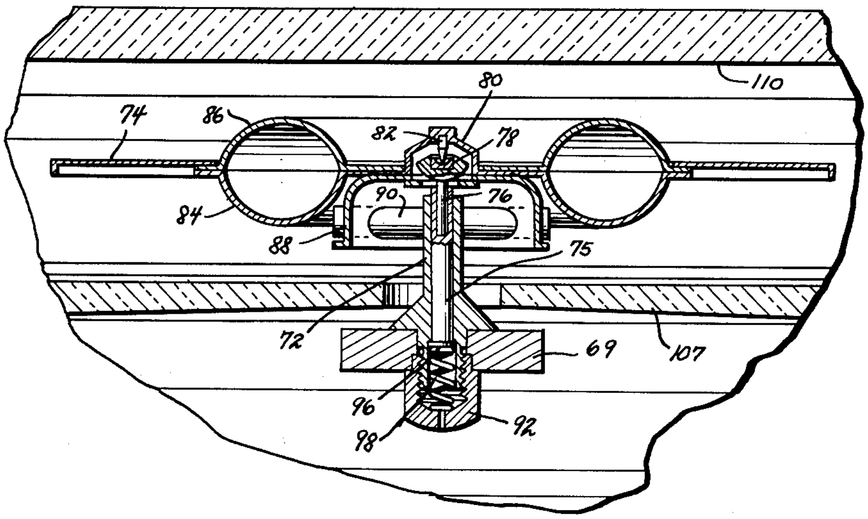
Fig. 7 is a view taken on lines 7—7 of Fig. 6.

As shown in Figs. 5, 6 and 7, the compass bowl comprises a bottom portion 69 having a central aperture 70 positioned therein. This central aperture is provided in the bottom portion for receiving a jewel post base 72 for supporting the usual compass card 74 at its upper end. The jewel post base is hollow and has an outwardly extending flange near its lower end which is adapted to rest on the upper side of the bottom portion of the bowl. Fixed within the jewel post base is a jewel post stem 75 which extends upwardly through said post base and has a long cylindrical opening bored into its upper end for receiving a jewel supporting member 76. Secured within the jewel supporting member is a jewel 78 and positioned around said jewel member, and completely enclosing it, is a pivot supporting structure 80 having a pivot pin 82 mounted in its upper end extending in a downward direction so as to have its pointed end rest in the cavity formed in the upper portion of the jewel. The pivot support 80 comprises the central part of a float base 84 and secured to said float base is a mating float cap 86 which forms with said float base a hollow annular chamber adapted to have compass card 74 fitted around its outer periphery.

Positioned within the circular chamber formed by the curving walls of the float base is a magnet support 88, Fig. 7, which lies beneath said float base and is secured thereto by means of rivets. The purpose of this magnet base is to receive a pair of carefully matched Alnico magnets 90 which in effect forms the needle of the compass. The compass card and the elements comprising the float cap, float base and magnet support are made out of any type of non-magnetic material, such as plastic or aluminum. Since the material contained in these parts is of a non-magnetic nature, it is necessary that a north and south pole be effectively established in a position very close to the center line of the compass card so as to have the north end of the card or the cardinal point marked north truly indicate magnetic north. The matched pair of magnets 90 effectively serve this purpose.

The bottom end of the jewel post base 72, which extends through the central bottom portion of the bowl, is secured to said bottom portion by means of a cap 92. The bottom of the jewel post base is adapted to lie within the confines of a bellows 94, which is filled with a special compass fluid. A stop washer 96 is fitted against the lower end of the jewel stem and held securely in place by means of a spring 98 which presses at its upper end against the bottom portion of said stop washer and at its lower end against the inside of the cap 92 thereby providing a cushioned support for the jewel post. The bellows 94 is secured at its top end to the bottom portion of the bowl and at its lower end to the top portion of a framing ring 100. A lower bezel ring 102, Fig. 5, is held to the bottom portion of the framing ring by means of a pair of screws which extend around the periphery of said rings. The purpose of these rings is to secure bottom glass or crystal 104 in watertight relationship with the bellows positioned immediately thereabove. In order to secure such a watertight fit, appropriate gaskets 106 are positioned between the crystal and each of the two rings above mentioned. Adapted to rest in the inside portion of the compass bowl is an intermediate baffle crystal 107 having a central aperture 108 therein to allow movement of the compass fluid located within the bellows through said aperture and into the area thereabove, such movement being caused by expanding and contracting action of the fluid as it is alternately heated and cooled by surrounding air temperatures. The special type of compass fluid mentioned above is a highly refined fraction of crude petroleum having a more constant viscosity with changes of temperature than the conventional alcohol mixture. This provides increased accuracy and a more constant damping characteristic of the card and float element over a wide range of temperature. The top of the compass proper is made watertight by the use of a top crystal 110 which is secured to the compass bowl by means of an upper bezel ring 112.

Fitted in the side of reflector 68 is a socket 114, Fig. 6, for a light bulb 116 which is adapted to lie within the reflector and radiate light upwardly through the lower and baffle crystals 104 and 107, and through the liquid contained within the areas defined by the lower and top crystals. The light is reflected down on to the compass card by means of a highly polished inner section 118 of bowl 68. Electrical conductors 120 extend outwardly from the socket through the compass binnacle where they are adapted to be connected to the electrical lighting system in the ship.

As mentioned above, the advent of degaussing has been such that the results of such degaussing adversely effect the operating characteristics of magnetic compasses located inside the ship. The degaussing coils are located or positioned within each type of ship in the following manner: the M coil (main coil) encircles the ship in a horizontal plane, usually at about the level of the waterline, and is customarily located within the confines of the ship and is designed to neutralize the vertical component of the permanent and induced magnetization. The current magnitudes and polarity of the M coil are always set so as to create a field approximately equal to and opposite to that of the vertical component of the ship's field. The magnitude of the current flowing through the M coil will be dependent upon the strength of the ship's field resulting from the addition or subtraction (as appropriate) of the permanent and induced vertical components, which may be either the same or of opposite polarity. There are two coils in addition to the main coil that are used for effectively neutralizing the effect of magnetic fields, and these are commonly referred to as F and Q coils. The F coil encircles the forward ⅓ or ¼ portion of the ship and is usually found beneath the forecastle or other uppermost deck, while the Q coil encircles the after ⅓ or ¼ of the ship and is usually found just beneath the quarter-deck or other uppermost after deck, the purpose of the F and Q coils being to neutralize the effect of the ship's fore and aft (or longitudinal) permanent and induced horizontal magnetization. When these coils are energized in order to change the magnetic structure or field acting on the ship, a corresponding change must be made in the field surrounding the magnetic compass.

In order for this field to be effectively neutralized, there are a plurality of small coils located within the binnacle section of the compass of the instant invention. These coils serve the same purpose as the large coils located in the ship, that is, they neutralize the magnetic fields surrounding the compass in a fore and aft, athwartship and vertical direction. When the current is passed through the ship's degaussing coils, it is obvious that if a current of a proportional amount is not passed through each of the coils located in the compass it will be impossible to accurately decrease the fields surrounding the compass. Accordingly the compensating coils of the compass are normally tied into the respective coils located in the ship so that the amount of current passed through the compass coils can be regulated according to the extent of energization of the ship's degaussing coils. The controls and resistors used for this purpose are, as aforementioned, located in the pedestal supporting the compass. The particular mean used for varying the flow of current in the compass coils do not comprise a part of this invention, although the specific arrangement and mounting of the coils in the compass binnacle are new.

Figures 8, 9, 10:
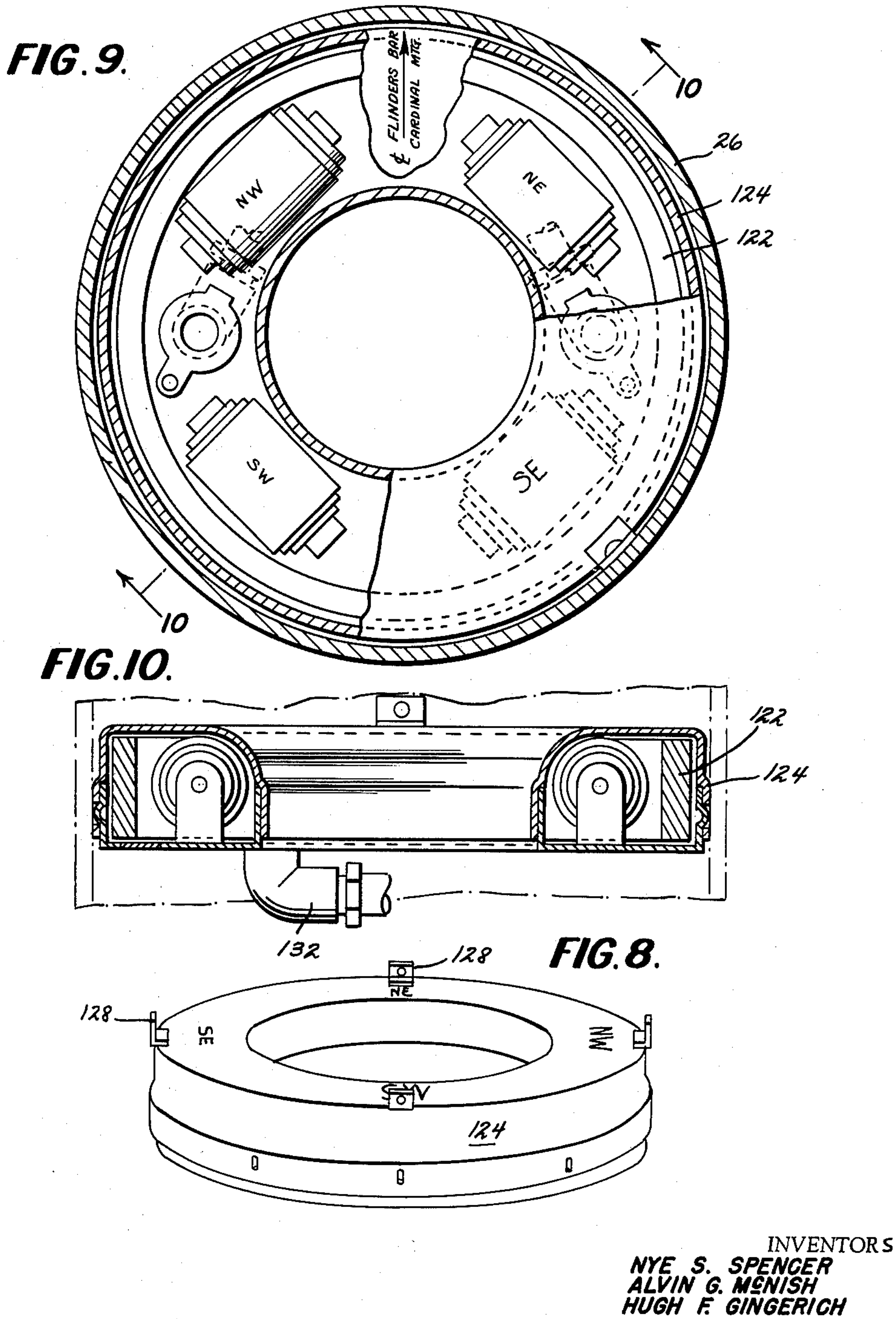
Fig. 8 is a perspective view of a container for holding the degaussing coils located in the bottom portion of the binnacle.
Fig. 9 is a plan view in section of the degaussing unit of Fig. 8 with the cover removed.
Fig. 10 is a view taken on lines 10—10 of Fig. 9.

Referring now to Figs. 5, 8, 9 and 10, the compass compensating coil that balances the fore and aft magnetic effect is commonly referred to as the "B" coil while the athwartship component effect is referred to as the "C" coil. There are many variations in the types and the manner in which the coils are located with respect to the compass proper and the particular type shown in the instant invention comprises NW/SE coils and are so-called because of the relative location of the coils on the binnacle, and also because these are the headings on which the coils are individually compensated. Thus the magnetic component of an inner cardinal coil which is in the forward-port/aft-starboard direction is called the "NW/SE" component and the coil which produces it is called the NW coil for brevity. Similarly, the magnetic component produced in the forward-starboard/aft-port direction is called the "NE/SW" component and this coil is normally referred to as the NE coil or component. These coils are shown in Fig. 9 and are accordingly indicated as NW, NE, etc., coils. The coil that balances the vertical component is commonly referred to as a heeling coil ("H"), this coil being indicated at 122. For convenience in locating such coils within the binnacle sections of the compass, such coils are located within an annular or toroidal casing 124.

This toroidal casing 124 is adapted to rest on a circular ring 126 closely fitted to the inside portion of the binnacle shell and is secured thereto by any appropriate means, such as metal screws or bolts. In order to prevent movement of the coil containing casing, small pieces of metal formed in the shape of angle-irons 128 and secured to the side of said casing are provided with openings therein which are adapted to receive screws for securing the casing to the inside portion of the binnacle shell. The coils are supported by means of upstanding brackets 130, Fig. 5, located within the casing and in order to provide conductors for supplying electrical energy to the coils, waterproof fittings 132 are provided which lead through the bottom portion of the binnacle base plate. The idea of incorporating these compass compensating coils within the binnacle, and in the manner shown herein, is considered to be novel since it is quite impractical to locate the coils in the pedestal below the binnacle.

In actual practice, the ship is provided with charts prepared by personnel who operate ranging stations, and these charts indicate the various values of current that are to be passed through the various coils depending on the particular heading that the ship is steering, the latitude in which the ship is operating, etc. The electrical circuits for supplying power to these compass compensating coils are well known and do not comprise a part of the instant invention as mentioned above. Such circuits, including the conductors, fixed resistors, rheostats and other controls, are likewise well known and are located within the pedestal portion of the compass.

In addition to the compass compensating coils, there are also included in the binnacle portion of the compass, a plurality of permanent magnets which serve the purpose of properly adjusting the compass to counteract permanent magnetic fields which pass through the compass. These permanent magnets are necessary in the operation of all magnetic compasses installed on the ships and the particular means for locating these correctors in relation to one another comprises novel subject matter, the details of which are disclosed in the co-pending application by the same inventors, Serial Number 319,351, filed November 7, 1932.

It should be noted that a distinction between compass compensation and compass adjustment has been established and maintained in this application. The fundamental principle of compass compensation as used herein is to create magnetic fields at the compass which are at all times equal and opposite to the magnetic effects of the degaussing system while compass adjustment as used herein is the arranging of magnet and soft iron correctors about the binnacle so that their effects are equal and opposite to the effects of the magnetic material in the ship. The magnetic conditions in a ship which affect the magnetic compass are permanent and induced magnetism, as pointed out above.

Figure 11:
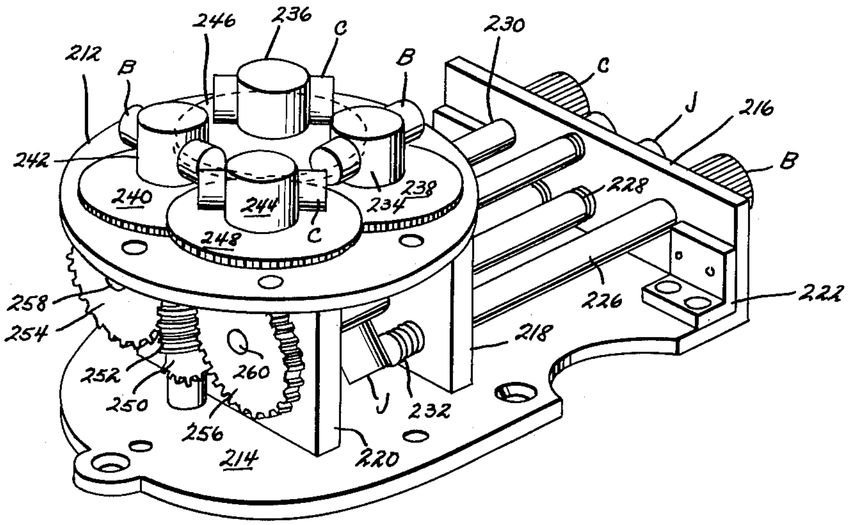
Fig. 11 is a perspective view of the magnet corrector unit shown in the bottom portion of the binnacle in Fig. 5.
Figure 12:
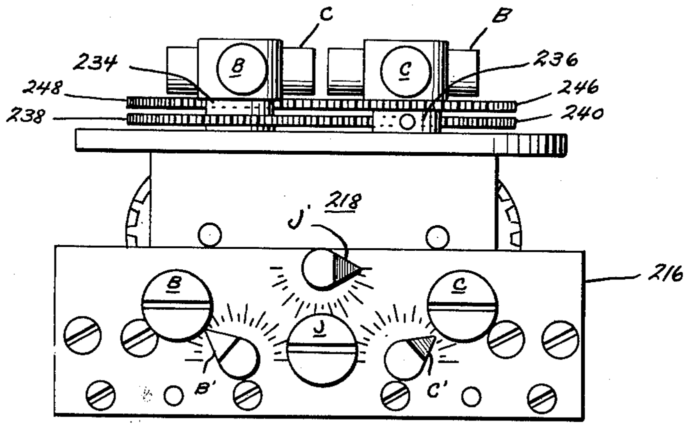
Fig. 12 is a front view in elevation of the corrector unit shown in Fig. 11.

Referring to Figs. 11 and 12, it will be seen that these magnets are incorporated in a gearing unit which is adapted to move each of the three pairs of magnets with respect to one another. The structure comprises a top plate 212, a bottom plate 214, a front plate 216, an intermediate plate 218 and a back plate 220. The intermediate and back plates are secured between the top and bottom plates by means of screws, while the front plate is fixed to the bottom plate by means of angle brackets 222. The three different types of magnets are commonly referred to in the art as "B," "C" and "J" correctors. The "B" correctors counteract horizontal magnetic fields running in a fore and aft line of the ship, the "C" type correctors counteract magnetic fields running athwartship, while the "J" type correctors counteract fields that run vertically through the ship. As shown in Fig. 11, the "B" and "C" type of magnets are positioned on the top plate 212, while the "J" type magnets are located between intermediate plate 218 and back plate 220.

These correctors are rotated to any desired position by means of shafts which are connected to such correctors through gearing units at one end and at their other ends extend through the front plate where the shaft turning knobs and indicators are positioned. Referring to Fig. 12, it will be seen that the front plate 216, which is adapted to fit into opening 48 in the binnacle shell, has three knobs B, C and J mounted thereon which are respectively connected to shafts 226, 228 and 230. In order to determine the exact position of any set of correctors within the assembly, pointers B′, C′ and J′ are mounted adjacent to their respective corrector control shafts 226, 228 and 230, thus making it convenient to determine such corrector positions while at the same time adjusting the control knobs. Shaft 226 terminates in a worm 232 which meshes with a worm gear mounted near the lower end of shaft 234. Shaft 230 likewise terminates in a worm that meshes with a worm gear (not shown) mounted near the lower end of shaft 236. A spur gear 238 is fixed to shaft 234 immediately above top plate 212 and engages a like spur gear 240 fixed to shaft 242 which contains the second of the "B" magnet correctors. Shafts 236 and 244 holding the C correctors also have meshing spur gears 246 and 248 secured adjacent their upper ends.

In operation, shaft 226 is turned by means of manual manipulation of knob B thus turning worm 232. Worm 232 meshes with a worm gear (not shown) to rotate shaft 234 and the B corrector connected thereto. Since spur gear 238 meshes with gear 240, shaft 242 and its attached B corrector is rotated an amount equal in degrees to that through which shaft 234 has turned. The ends of the pointer shafts terminate in a miter gear between intermediate and back plates 218 and 220 and are adapted to engage like miter gears (not shown) on the bottom of shafts 234 and 236 so that movement of the latter shafts rotates the pointer shafts an amount equal to that turned by the corrector shafts, thus accurately indicating by means of the pointers, the exact position of the correctors within the binnacle. The J or heeling correctors are rotated in substantially the same manner as the B and J correctors. Shaft 228 extends through back wall 220 and terminates in a miter gear which meshes with its counterpart 250. The latter is connected to a worm 252 which engages worm gears 254 and 256. Worm gear shafts 258 and 260 terminate between the intermediate and back walls and each contains one of the J correctors which rotate in unison according to movement of shaft 228. The J′ pointer shaft is gear connected to shaft 258 so as to indicate the position of the J correctors.

The above-described structure supporting the permanent magnets is adapted to be secured to the bottom wall of binnacle shell 26 by means of bolts 24. As shown in Fig. 5, the corrector unit is centrally positioned within the toroidal casing 124, thus conveniently incorporating all the essential elements of the magnetic compass within binnacle 14.

In view of the foregoing, it is apparent that the instant invention discloses a magnetic compass, binnacle and pedestal assembly which incorporates all necessary magnet and soft iron correctors, adjustment facilities, coil correctors and desirable operating features into a complete, compact, high precision unit.

It should be understood that the foregoing disclosure relates to only a preferred embodiment of the invention and that numerous modifications or alterations may be made therein without departing from the spirit and the scope of the invention as set forth in the appended claims.

What is claimed is:

1. In combination, a magnetic compass assembly comprising a circular binnacle supporting said compass, a quadrantal corrector bracket surrounding said binnacle, a pair of quadrantal correctors on said bracket, a toroidal casing in said binnacle, a plurality of compass compensating coils in said casing, a plurality of compass adjusting correctors, means mounting said correctors in said binnacle and within a hollow central portion provided by said toroidal casing, and means supporting said compass in said binnacle, said compass supporting means comprising a binnacle ring secured in the top peripheral portion of said binnacle, a gimbal ring, means pivotally supporting said gimbal ring in said binnacle ring along a fore and aft axis thereof, and trunnion means pivotally holding said compass in said gimbal ring for rotary movement perpendicular to said fore and aft axis.

2. In combination, a magnetic compass assembly comprising a circular binnacle supporting said compass, a slewable quadrantal corrector bracket surrounding said binnacle, a pair of quadrantal correctors on said bracket, indicating means on said bracket for positioning said correctors with respect to said compass, a toroidal casing in said binnacle, a plurality of compass compensating coils in said casing, said plurality of compensating coils including two pairs of coils with the individual coils of each pair of coils arranged diametrically opposite each other and with one pair of such coils arranged on an axis spaced 90 degrees from a second pair of such coils, a plurality of compass adjusting correctors, means mounting said compass adjusting correctors in said binnacle at least partly within a space bounded by an inner upright wall of said toroidal casing, said toroidal casing with the plurality of compensating coils located therein and said compass adjusting correctors being so constructed and arranged wholly within said binnacle as to form a compact structure, and means supporting said compass in said binnacle, said compass supporting means comprising a rotatable binnacle ring secured in the top peripheral portion of said binnacle, a gimbal ring, means pivotally supporting said gimbal ring in said binnacle ring along a fore and aft axis thereof, and trunnion means pivotally holding said compass in said gimbal ring for rotary movement perpendicular to said fore and aft axis.

3. In combination, a magnetic compass assembly comprising a circular binnacle supporting said compass, a slewable quadrantal corrector bracket surrounding said binnacle, a pair of quadrantal correctors on said bracket, a toroidal casing in the bottom portion of said binnacle, a plurality of compass compensating coils in said casing, a plurality of compass adjusting correctors, means mounting said compass adjusting correctors in said binnacle, and means pivotally supporting said compass in said binnacle along a fore-aft and athwartship axis, said compass comprising a cylindrical bowl with an integral bottom wall having a central aperture therein, a compass card, and means fixed to said bottom wall pivotally supporting said compass card in said compass.

4. The combination according to claim 3 wherein said bottom wall is adapted to permit the passage of light therethrough and said compass bowl has a depending bottom cover affixed thereto, reflecting means above said card, a light reflector secured to the bottom inner portion of said cover, and a light bulb in said reflector whereby light is emanated upwardly to said reflecting means for illuminating said compass card.

5. In combination, a magnetic compass assembly comprising a compass and a circular binnacle, means supporting said compass in said binnacle, a plurality of corrector magnets in said binnacle, said supporting means comprising a movable binnacle ring mounted on the top of said binnacle, a gimbal ring pivotally mounted in said binnacle ring, and needle bearing means mounting said compass in said gimbal ring, said compass comprising an open-topped bowl having a central aperture in the bottom wall thereof, a compass card, means secured to said bottom wall for pivotally supporting said compass card, an expansion chamber positioned below said bottom wall, said expansion chamber comprising a bellows having its upper end secured to the outer peripheral portion of said bottom wall, a circular ring secured to the lower end of said bellows, a bottom glass secured in watertight relationship with said ring, an upper glass secured in watertight relationship with the top of said compass bowl, thereby forming a watertight chamber between said upper bottom glass, a transparent fluid filling said watertight chamber whereby said compass card is adapted to float in said fluid and light from a source is adapted to pass through said fluid to said card, a light source secured immediately below said bottom glass, and light reflecting means located on said open-topped bowl between said compass card and said upper glass, the construction and arrangement being such that said compass card is indirectly and substantially uniformly illuminated by said light source regardless of movement of the compass in said supporting means.

6. In combination, a magnetic compass adapted for mounting in a binnacle, said compass comprising an open topped bowl having a bottom wall with a plurality of openings therein, an upper glass plate closing the top portion of said bowl, an intermediate glass plate having a central aperture positioned immediately above said bottom wall, an expansion chamber adjacent said bottom wall, said expansion chamber comprising a bellows secured at its upper end to the outer peripheral portion of said bottom wall and terminating at its lower end in a ring, a bottom glass plate held in watertight relationship with said ring, a fluid filling the space between said upper and bottom plates, a float in said compass bowl, said float comprising a circular hollow ring having means for supporting a compass card on its outer periphery, a pair of matched magnets secured to said float, means pivotally supporting said float and attached card in the central portion of said bowl, a bottom cover secured to the bottom portion of said bowl enclosing said expansion chamber, a transparent reflector attached to the inner side of said bottom cover, a light source in said reflector, and reflecting means between said card and said upper glass plate, whereby light from said source passes through said fluid to said reflecting means for indirectly illuminating said card.

7. The combination according to claim 6 wherein said float supporting means comprises a jewel post base having a jewel mounted in its upper end, means securing said post base to said bottom wall of said bowl, a pivot supported by said jewel, means securing said pivot in a pivot supporting member, means connecting said pivot supporting member to said float whereby said float is adapted to be supported by said jewel.

References Cited in the file of this patent

UNITED STATES PATENTS

| | | |
|---|---|---|
| 370,248 | Cross | Sept. 20, 1887 |
| 1,679,764 | Colvin | Aug. 7, 1928 |
| 2,350,402 | Krasnow et al. | June 6, 1944 |

FOREIGN PATENTS

| | | |
|---|---|---|
| 676 | Great Britain | Mar. 9, 1867 |
| 4,876 | Great Britain | Dec. 18, 1876 |
| 13,752 | Great Britain | June 22, 1896 |
| 5,346 | Great Britain | Mar. 7, 1903 |
| 405,252 | France | Nov. 10, 1909 |
| 199,988 | Great Britain | July 5, 1923 |